United States Patent
Frolik et al.

(10) Patent No.: US 8,452,508 B2
(45) Date of Patent: *May 28, 2013

(54) BRAKING SYSTEM FOR PATIENT SUPPORT

(75) Inventors: Zbynek Frolik, Slany (CZ); Ladislav Schejbal, Kladno (CZ); Vladimir Kolar, Slany (CZ)

(73) Assignee: Linet spol. s.r.o., Slany (CZ)

( * ) Notice: Subject to any disclaimer, the term of this patent is extended or adjusted under 35 U.S.C. 154(b) by 469 days.

This patent is subject to a terminal disclaimer.

(21) Appl. No.: 12/781,604

(22) Filed: May 17, 2010

(65) Prior Publication Data

US 2011/0120815 A1 May 26, 2011

Related U.S. Application Data

(63) Continuation-in-part of application No. 12/093,169, filed as application No. PCT/CZ2006/000074 on Oct. 30, 2006, now Pat. No. 8,024,101.

(30) Foreign Application Priority Data

Nov. 10, 2005 (CZ) .......................... PUV 2005-17161

(51) Int. Cl.
*B60K 1/00* (2006.01)

(52) U.S. Cl.
USPC ................ 701/70; 701/1; 701/116; 180/19.1; 188/1.12; 280/47.34; 5/86.1

(58) Field of Classification Search
USPC ............... 701/1, 70, 116; 307/10.8; 188/1.12; 180/19.1; 280/47.34; 5/86.1
See application file for complete search history.

(56) References Cited

U.S. PATENT DOCUMENTS

| | | | |
|---|---|---|---|
| 3,247,923 A | | 4/1966 | Cornell |
| 4,336,858 A | * | 6/1982 | Loyzim ......................... 180/179 |
| 4,720,893 A | * | 1/1988 | Mellwig et al. ............... 16/35 R |
| 4,998,320 A | * | 3/1991 | Lange ........................... 16/35 R |
| 5,377,372 A | | 1/1995 | Rudolf et al. |
| 6,015,194 A | | 1/2000 | Decker |
| 6,056,373 A | | 5/2000 | Zechmann et al. |
| 6,089,593 A | * | 7/2000 | Hanson et al. ................ 280/650 |

(Continued)

FOREIGN PATENT DOCUMENTS

| | | |
|---|---|---|
| JP | 2003-153962 A | 5/2003 |
| RU | 2177899 C2 | 1/2002 |
| WO | 02/074216 A2 | 9/2002 |

OTHER PUBLICATIONS

Office Action issud by the USPTO in co-pending U.S. Appl. No. 12/093,169 on Jan. 1, 2011.

(Continued)

*Primary Examiner* — Russell Frejd
(74) *Attorney, Agent, or Firm* — Thedford I. Hitaffer; Hitaffer & Hitaffer, PLLC

(57) ABSTRACT

An assembly controls brakes on beds for use in healthcare facilities. The bed comprises at least one caster device supporting a base frame in relation to a supporting surface. The caster device has a caster brake. A brake control assembly is operatively engageable with the caster brake to engage the caster brake. The brake control assembly comprises a sensor for sensing a status condition of the caster brake. A controller is connected to the sensor. The controller causes engagement of the caster brake when the sensor senses the status condition for a predetermined period of time.

20 Claims, 9 Drawing Sheets

U.S. PATENT DOCUMENTS

| | | | |
|---|---|---|---|
| 6,098,732 | A | 8/2000 | Romick et al. |
| 6,264,006 | B1 | 7/2001 | Hanson et al. |
| 6,321,878 | B1 | 11/2001 | Mobley et al. |
| 6,322,161 | B1 * | 11/2001 | Maslonka et al. ............... 303/89 |
| 6,341,393 | B1 * | 1/2002 | Votel .............................. 5/81.1 T |
| 6,450,587 | B1 * | 9/2002 | MacGregor et al. ............. 303/89 |
| 6,609,595 | B2 * | 8/2003 | Flynn et al. .................... 188/156 |
| 6,685,281 | B2 * | 2/2004 | MacGregor et al. .......... 303/123 |
| 6,772,850 | B1 | 8/2004 | Waters et al. |
| 6,983,827 | B2 * | 1/2006 | Swift ............................... 188/19 |
| 7,162,757 | B2 | 1/2007 | Edgerton |
| 7,293,307 | B2 | 11/2007 | Edgerton |
| 7,346,942 | B2 | 3/2008 | Reinke et al. |
| 7,401,873 | B2 | 7/2008 | Werner |
| 7,420,461 | B2 | 9/2008 | Nebolon et al. |
| 7,559,098 | B2 | 7/2009 | He |
| 7,708,120 | B2 | 5/2010 | Einbinder |
| 7,886,377 | B2 * | 2/2011 | Hamberg et al. ................ 5/86.1 |
| 8,191,909 | B2 * | 6/2012 | Livengood et al. ........ 280/47.34 |
| 2003/0214185 | A1 | 11/2003 | Kinder et al. |
| 2004/0049324 | A1 * | 3/2004 | Walker ............................... 701/1 |
| 2004/0124697 | A1 * | 7/2004 | MacGregor et al. ............ 303/89 |
| 2006/0102392 | A1 | 5/2006 | Johnson et al. |
| 2007/0051566 | A1 | 3/2007 | Marlow |
| 2008/0091309 | A1 * | 4/2008 | Walker ............................... 701/1 |
| 2008/0229545 | A1 | 9/2008 | Duvert et al. |
| 2008/0264733 | A1 | 10/2008 | Hayes et al. |
| 2009/0120736 | A1 | 5/2009 | Masterson et al. |

OTHER PUBLICATIONS

International Preliminary Report on Patentability for Int'l Application No. PCT/CZ2006/000074.

International Search Report dated May 21, 2007, for Int'l Application No. PCT/CZ2006/000074.

* cited by examiner

BRAKING SYSTEM FOR PATIENT SUPPORT

CROSS-REFERENCE TO RELATED APPLICATIONS

This application is a continuation-in-part of U.S. patent application Ser. No. 12/093,169, filed May 9, 2008, which was published as US Patent Publication No. US2008/0234913 on Sep. 25, 2008, and issued as U.S. Pat. No. 8,024,101, and which is the National Phase of International Application No. PCT/CZ06/00074, filed Oct. 30, 2006, which published as WO 2007/054037 on May 18, 2007, and which claims priority to Czech Application No. PUV 2005-17161, filed. Nov. 10, 2005, the disclosures of which are incorporated herein by reference.

BACKGROUND OF THE INVENTION

This invention relates in general to beds and more particularly to healthcare facility beds having four casters or wheels attached to a base frame and that can turn around a horizontal axis for moving the bed from one location to another location and a brake for maintaining the bed in a desired position.

Falls pose a great problem from the medical, social and economic point of view in that falls can cause frequent complications and serious consequences, resulting in protracted patient pain and suffering, which in turn produces an obstacle to further therapy, resulting in extended treatment periods.

Falls in hospitals, nursing homes, and other healthcare facilities are common, particularly in subsequent care departments and geriatric clinics. Falls are most common as is the highest risk contingency among older people and chronically ill patients. According to the statistics of the National Center for Injury Prevention in the USA (NCIP), the probability of falls significantly rises in people over 65.

In any event, a fall poses a direct risk to a patient's state of health and often causes the patient further pain and suffering. Common consequences of falls are hematomas, open wounds, and fractures. Moreover, falls among older people often result in a collum fracture, including subsequent, sometimes fatal, complications.

This generally has an economic effect on the management of the healthcare facilities. After a fall, the patient is subject to several examinations, is X-rayed, or even has to undergo surgery. Longer hospitalization also requires more work for hospital staff. Moreover, healthcare facilities are often threatened with litigation by patients and their relatives.

The prompt identification of risk patients and risk areas can ensure greater safety for patients and save the healthcare facilities a lot of money. The internal causes are subjected to change by state of health and type of illness. For example, patients recovering from a stroke frequently exposed to a greater risk of a fall. Considerably, at risk are patients with dementia and patients using psycho pharmaceuticals, hypnotics, or anti-depressants. External causes of falls are related to various aids (e.g., crutches and prosthetic devices), and particularly technical conditions of the environment (e.g., bad lighting, bed elevation, slippery floor, thresholds, and an unstable chair). To a great degree, risk of a fall is also attributed to a bed that is free to move.

Healthcare facility beds are typically designed to be moved from one location to another location and, therefore, have wheels that can turn around a horizontal as well as vertical axis which permit the hospital bed to be rolled and steered between locations. During movement of the bed, it is desirable to have free rolling wheels but upon reaching a desired location, a brake is usually applied to the wheels to maintain the bed at the desired position.

Such beds typically have brake and steer caster devices, which include mechanisms (i.e., brake mechanisms) for blocking the rotation of the wheels, and mechanisms (i.e., steering lock mechanisms) for blocking swiveling movement of the caster fork (i.e., for preventing the wheels from turning around a vertical axis). Some beds have four caster devices and pedals located on opposite sides of the bed that control the brake and steering lock mechanisms of each caster.

Some healthcare facility beds are equipped with four separate brake mechanisms and/or steering lock mechanisms and four separate brake pedals and/or steer pedals, each associated with only one of the four caster devices. Each brake pedal only applies the brakes of the caster device with which it is associated. Each steer pedal only operates the steering lock mechanism on the caster device with which it is associated. Prior to moving such beds, the caregiver must release all four brakes by operating all four pedals, and after moving the bed, the caregiver must apply all four brakes by again operating all four pedals.

Some beds are equipped so that the brakes are applied at all four caster devices by operating any one of four pedals associated with the caster devices. Caregivers are able to operate all of the steering lock mechanisms on the caster devices having such mechanisms by operating a steer pedal on any one of the four caster devices.

Some beds are equipped with a common three-position control mechanism that can be operated from several places (e.g., with a system of mechanically interconnected levers positioned at individual caster devices). In a central position of the levers of the three-position control mechanism, all the wheels can freely turn around their horizontal as well as vertical axis. This position is referred to as "unbraked." The bed can be freely moved in all directions. In the lower position of the levers of the three-position control mechanism, turning of all the wheels both around the horizontal axis and around the vertical axis is blocked. This position is referred to as "braked." Finally, in the upper position of the levers of the three-position control mechanism, turning of one wheel around the vertical axis is locked in a pre-selected position, generally in a position that is parallel to the longitudinal axis of the bed. The other wheels can freely turn both around their horizontal axis and around their vertical axis. The bed can be moved while the wheel locked in the position parallel to the longitudinal axis of the bed facilitates keeping the straight movement direction for the personnel transporting patients along hospital corridors.

Known beds with five wheels work in a similar manner while their fifth wheel is positioned under the bed and can be locked in a pre-selected position with the above mentioned three-position control mechanism, common for the control of the functions of all the wheels described above.

In some beds, the control mechanism comprises a separate two-position control mechanism that controls the brakes of all braked wheels and a separate control mechanism that controls the steering lock of wheels, the turning of which around the vertical axis can be locked in a pre-selected position.

A common disadvantage of all the known undercarriages for hospital beds is that if the staff member forgets to apply the brakes after stopping and putting the bed aside, the patient may get injured if he/she leans against the bed thinking that the brakes are applied. In such a case the bed starts to move and the patient may fall, which may have severe consequences, especially in the case of older or disoriented patients. Further, during the transfer of a patient from the bed to a wheelchair or stretcher, the patient is at risk of falling in if the brakes are not applied.

SUMMARY OF THE INVENTION

This invention relates to a brake control assembly for controlling a caster brake on a bed for use in a healthcare facility. The brake control assembly is operatively engageable with the caster brake to apply the caster brake. A sensor is provided for sensing a status condition of the caster brake. A controller is connected to the sensor. The controller causes engagement of the caster brake when the sensor senses the status condition for a predetermined period of time.

Various advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
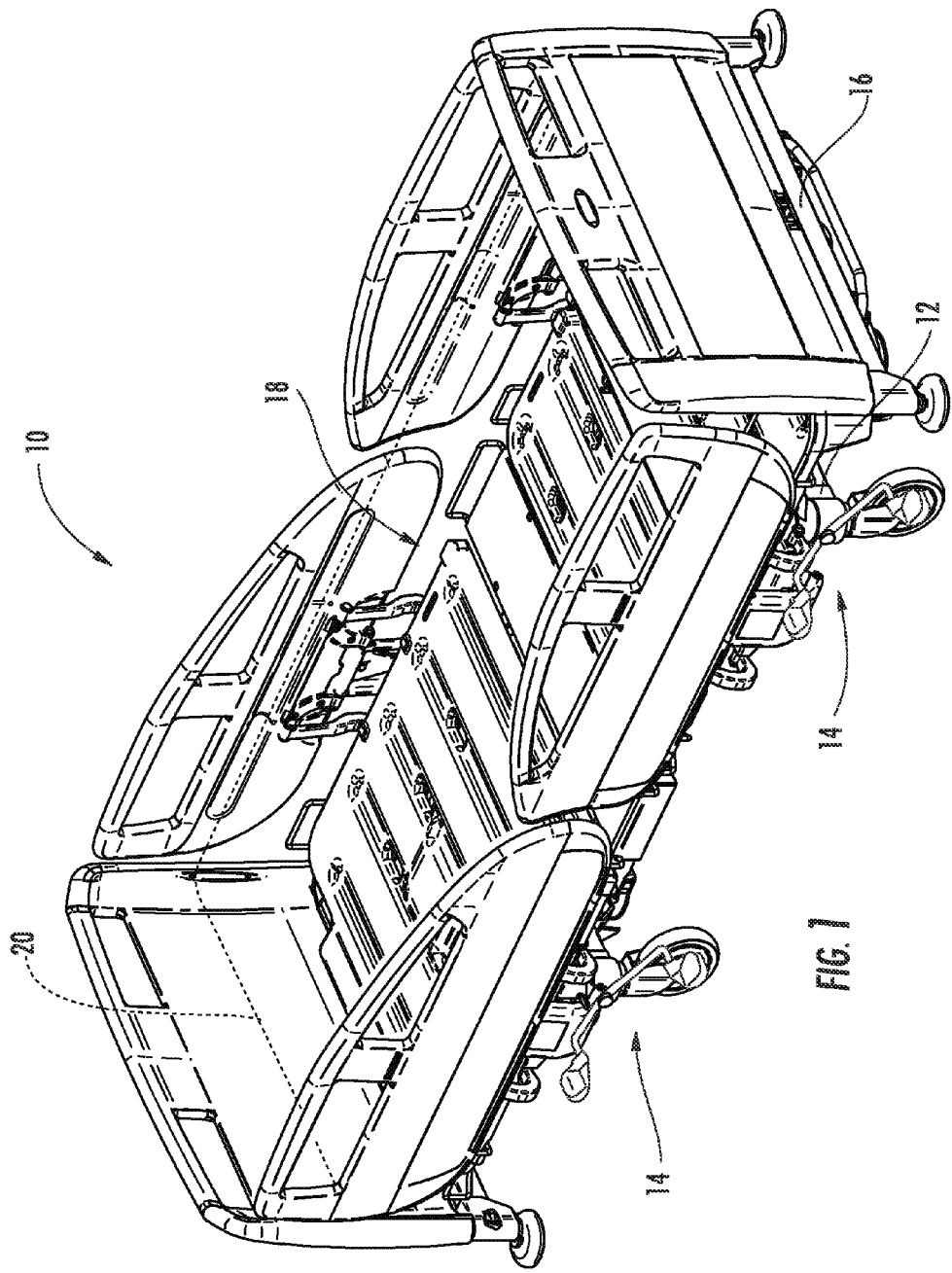
FIG. 1 is a side perspective view of an exemplary bed with a braking system.

Referring now to the drawings, there is illustrated in FIG. 1 a patient support apparatus (e.g., a bed, stretcher, or other suitable apparatus for use in healthcare facilities). The patient support will hereinafter be referred to as a bed 10. The bed 10 includes a base frame 12 supported for movement in relation to a supporting surface, such as the floor, by caster devices 14. An intermediate frame 16 is supported for vertical movement in relation to the base frame 12 by longitudinally spaced lift mechanisms, which may be in the form of telescopic columns. An articulated deck 18 may have deck sections that are mounted for pivotal movement in relation to the intermediate frame 16. The articulated deck 18 defines a supporting surface for a mattress 20, which in turn defines a patient support surface.

Figure 2:
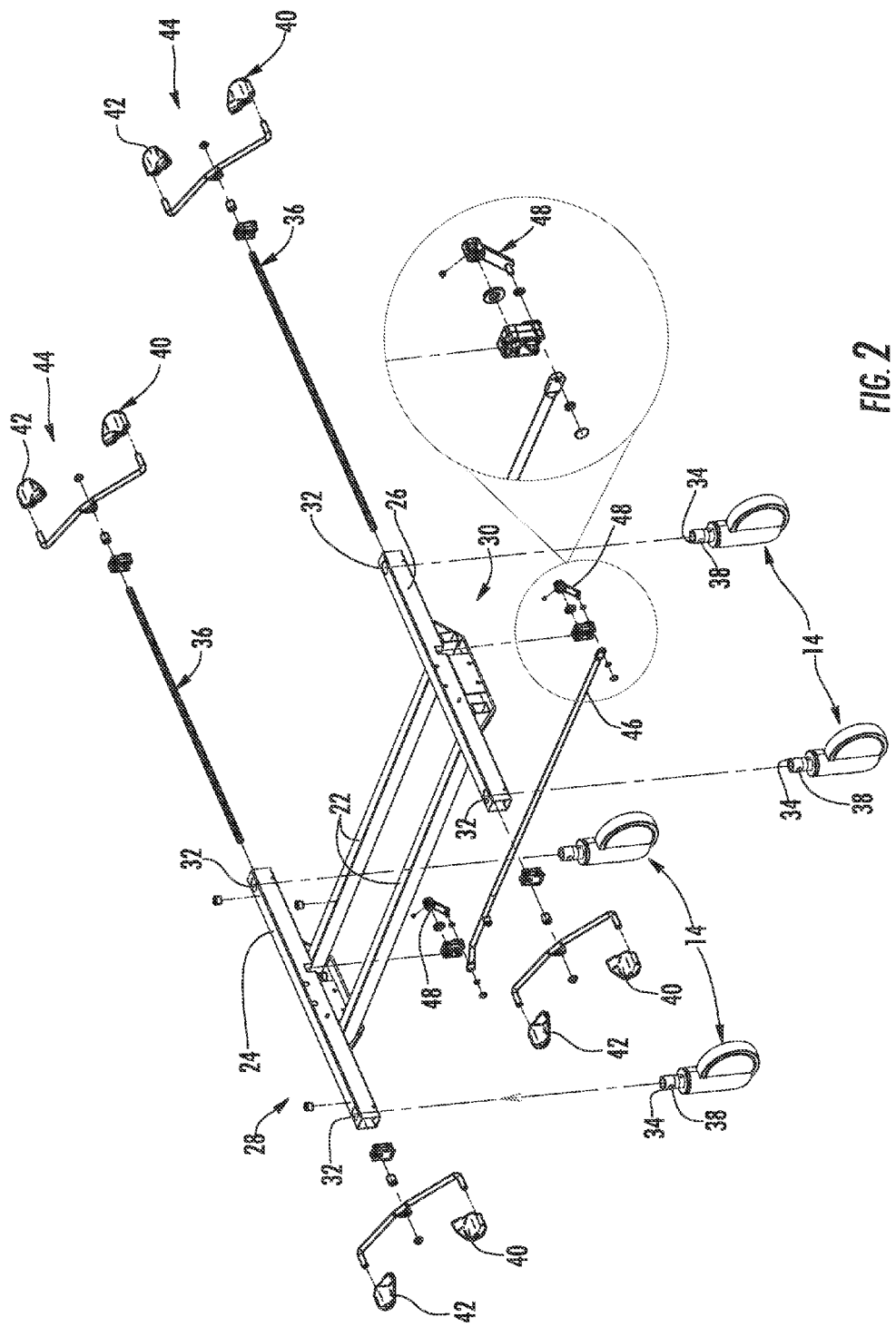
FIG. 2 is an exploded perspective view of an exemplary base frame and braking system.

As shown in FIG. 2, the base frame 12 may include one or more longitudinally extending frame members 22 connected to laterally extending cross members 24, 26. Illustratively, the frame members 22 are rectangular tubes, as are the cross members 24, 26. The bottom surface of each cross member 24, 26 is welded or otherwise fastened to the top surface of the head and foot ends of each frame member 22, so that the cross members 24, 26 extend laterally between and/or beyond the frame members 22.

Illustratively, the caster devices 14 are mounted in relation to the base frame 12 at head and foot ends 28, 30 of the bed 10. As shown in the drawings, the caster devices 14 may be mounted in relation to opposing lateral ends of the cross members 24, 26. Although the caster devices 14 may be mounted in any suitable manner, the opposing lateral ends of the cross members 24, 26 may be drilled, machined, bored, or otherwise formed to include openings 32 (e.g., substantially cylindrical openings), and the caster devices 14 may have a mounting sleeve 34 that has a cross section (e.g., substantially cylindrical openings) that is sized and configured to fit in the openings 32, so that the mounting sleeve 34 extends generally perpendicular to a longitudinal axis of the cross members 24, 26.

Although other types of caster devices may be utilized in conjunction with the bed 10, exemplary caster devices 14 include brake and steering lock mechanisms, which may be operated through rotation of a control shaft 36 or other suitable control component. Illustratively, the control shaft 36 has a hexagonal cross section, although other shafts may be suitable for actuating the brake and steering lock mechanisms. It should be noted that the control shaft 36 may extend through shaft access holes 38 drilled or otherwise formed through the caster devices 14.

Brake and steering lock pedals 40, 42 may be radially disposed on opposite sides of the control shaft 36. The brake and steering lock pedals 40, 42 may be operated by the foot of the caregiver. Each caster device 14 may include its own pedals 40, 42. It should be understood that operation of the pedals 40, 42 may cause clockwise and/or counterclockwise rotation of the control shaft 36. Although two pedals are shown (e.g., one pedal 40 to apply the brakes, and another pedal 42 to release the brakes), it should be understood that a single pedal 40 may be depressed to apply the brakes, and raised (e.g., with a caregiver's toe) to release the brakes.

The control shaft 36 may form a part of a brake system 44, which may be configured to allow common control of the caster devices 14 (e.g., allow a caregiver to operate the pedals 40, 42 of any of the caster devices 14 and thereby operate the brake and/or steering lock mechanisms of all of the caster devices 14 simultaneously). Thus, while called a "brake system," it is to be understood that brake system 44 may operate both the brake components and the steering lock components of the caster devices 14.

Simultaneous actuation of the brake and steering lock mechanisms of all caster devices 14 may be accomplished by mechanically linking the brake and steering lock mechanisms of all of the caster devices 14. Hence, the braking system 44 may mechanically link the control shafts 36 of each caster device 14 so that rotation of one control shaft 36 induces rotation of each of the control shafts 36. Although mechanical control components are shown, it should be appreciated that other electro-mechanical (e.g., solenoids) and/or non-mechanical (e.g. solid state or digital) components may be employed.

Although any suitable brake system may be employed, an exemplary brake system 44 includes a longitudinally extending brake and/or steering lock linkage rod 46 linking the control shafts 36 extending laterally between caster devices 14 at the head and foot ends 28, 30 of the bed 10. The linkage rod 46 may be operatively coupled to the control shafts 36 by control levers 48 or other suitable components. It should be appreciated that the control shafts 36, the linkage rod 46, and the control levers 48 may be disposed within the base frame 12, such as between the rectangular tubular frame member 22 and within the cross members 24, 26 of the base frame 12. It should further be appreciated that the control shafts 36 may extend through bushings and bushing blocks, which may act to stabilize the control shaft 36 to minimize play in the brake system 44.

In use, operation of any pedal 40, 42 may rotate a control shaft 36. Rotation of the control shaft 36 may simultaneously operate the caster devices 14 at opposing ends of the control shaft 36. Rotation of the control shaft 36 may also operate to cause angular displacement of a corresponding control lever 48. The control lever 48 may displace the linkage rod 46 in a longitudinal direction (i.e., in a direction along a line between the head and foot ends 28, 30 of the bed 10). Displacement of the linkage rod 46 may operate to cause angular displacement of the other control lever 48, which may rotate the other control shaft 36. The other control shaft 36 may simultaneously operate the caster devices 14 at the opposing ends of the other control shaft 36.

An exemplary caster device may be a 2032 series hospital bed caster manufactured by TENTE CASTERS Inc., 2286 Southpark Drive, Hebron, Ky. 41046. Such a device is shown and described in U.S. Pat. No. 7,506,404, issued on Mar. 24, 2009, to Wolfgang Block, the description of which is incorporated herein by reference.

Figure 3:
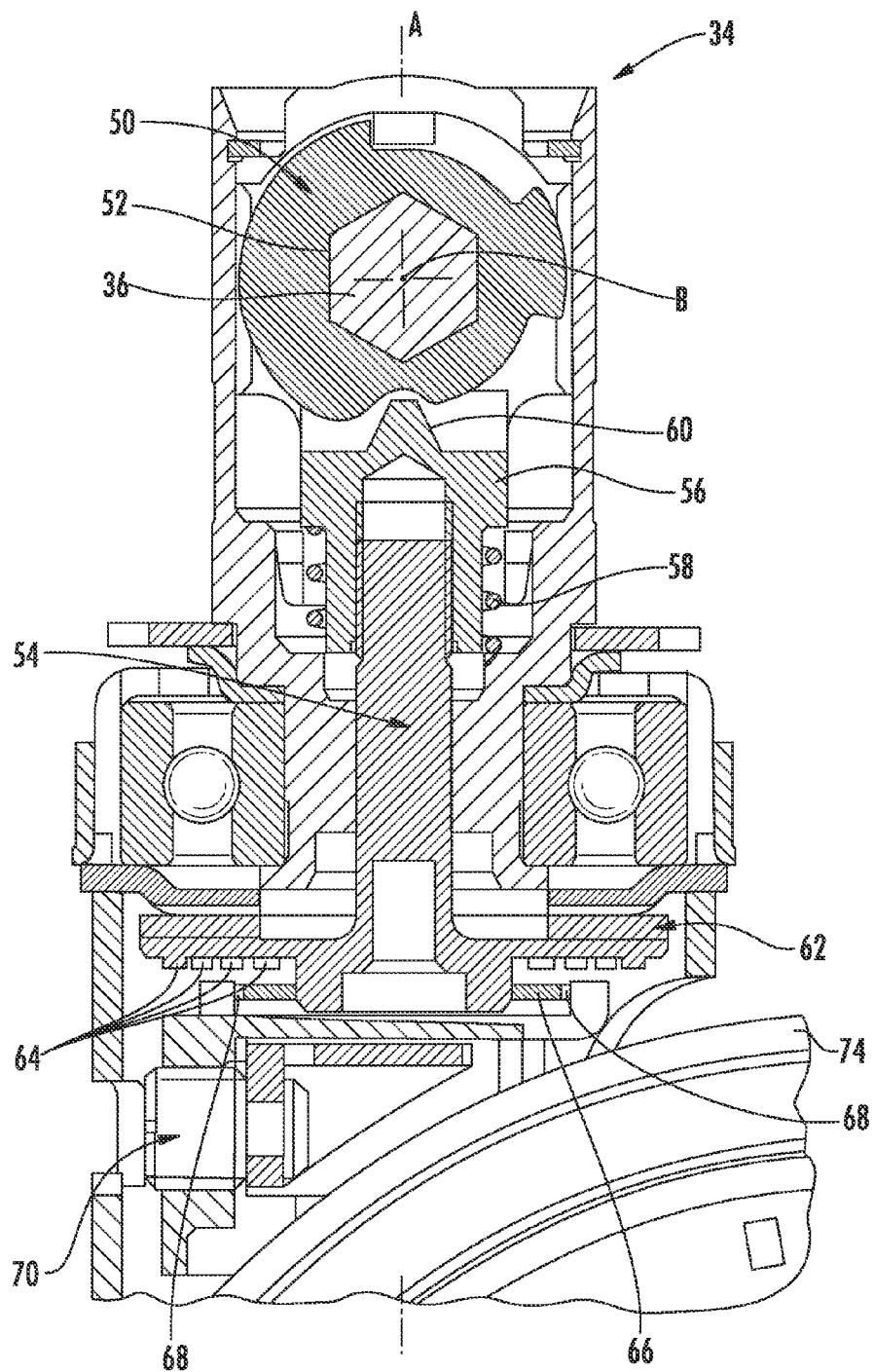
FIG. 3 is an enlarged, partial cross-sectional view of an exemplary caster device with the brakes released.

As shown in FIG. 3, the caster device 14 has a caster fork that can pivot about a pivot axis A. The fork includes legs flanking a wheel, which is mounted in a caster fork cavity. The wheel is supported for rotation by a wheel axle about a horizontal axis, which centrally passes through the wheel and is secured to ends of the fork legs.

The caster device 14 may include a control cam 50, which is disposed within the mounting sleeve 34, such that it can be pivoted about an actuating axis B. The actuating axis B is oriented at a right angle to the pivot axis A of the caster fork. The control cam 50 may be supported for pivotal movement within the mounting sleeve 34 in any known manner. In order for the control cam 50 to be supported for rotation, the exemplary control cam 50 has a centrally-disposed, non-circular opening 52, through which the control shaft 36 may pass. The cross-section of the control shaft 36 is configured, for form-fitting purposes, to mate with the cross-section of the opening 50.

Referring to the illustrations, a push rod 54 is provided beneath the control cam 50. This push rod 54 can be displaced vertically in the mounting sleeve 34 in a state in which it is oriented about the pivot axis A. A cam part 56 is connected to an upper end of the push rod 54, via a screw connection or other suitable connection. The cam part 56 is of cup-like configuration with a circular cross-section. The cam part 56 is guided vertically, with the push rod 54, within the mounting sleeve 34. The push rod 54 is biased in the direction of the control cam 50 by a compression spring 58. Furthermore, an upper end surface of the cam part 56, which is directed toward the control cam 50, has a central structure in the form of a mating cam 60.

The push rod 54 extends into the fork cavity, in the direction of the wheel. The enlarged-diameter integral structure, which performs the function of a steering lock plate 62, is formed integrally on the push rod 54 transversely to the pivot axis A. Rotation-blocking protrusions 64 are provided on the underside of the steering lock plate 62. These protrusions 64 run in the circumferential direction of the steering lock plate 62, coaxially with the pivot axis A.

A steering lock part 66 may be positioned in the fork cavity between the wheel and the steering lock plate 62. The steering lock part 66 may be secured in a rotationally fixed manner in relation to the fork. The steering lock part 66 substantially comprises a plate having rotation-blocking receivers 68, which run coaxially with the pivot axis A. The steering lock part 66 and the rotation-blocking receivers 68 are dimensioned and configured to those of the steering lock plate 62. The steering lock part 66 and the steering lock part 66, and more particularly, the rotation-blocking protrusions 64 and the rotation-blocking receivers 68, are responsible for locking the steering function of the caster device 14.

In the steering position, shown in FIG. 3, the steering lock plate 62 is released from the steering lock part 66 (i.e., the rotation-blocking protrusions 64 are released from the rotation-blocking receivers 68). In this position, there is no latching action. The caster fork is permitted to pivot about the pivot axis A. Additionally, the wheel is free to rotate. In this position, the bed 10 may be pushed and easily steered.

Figure 4:
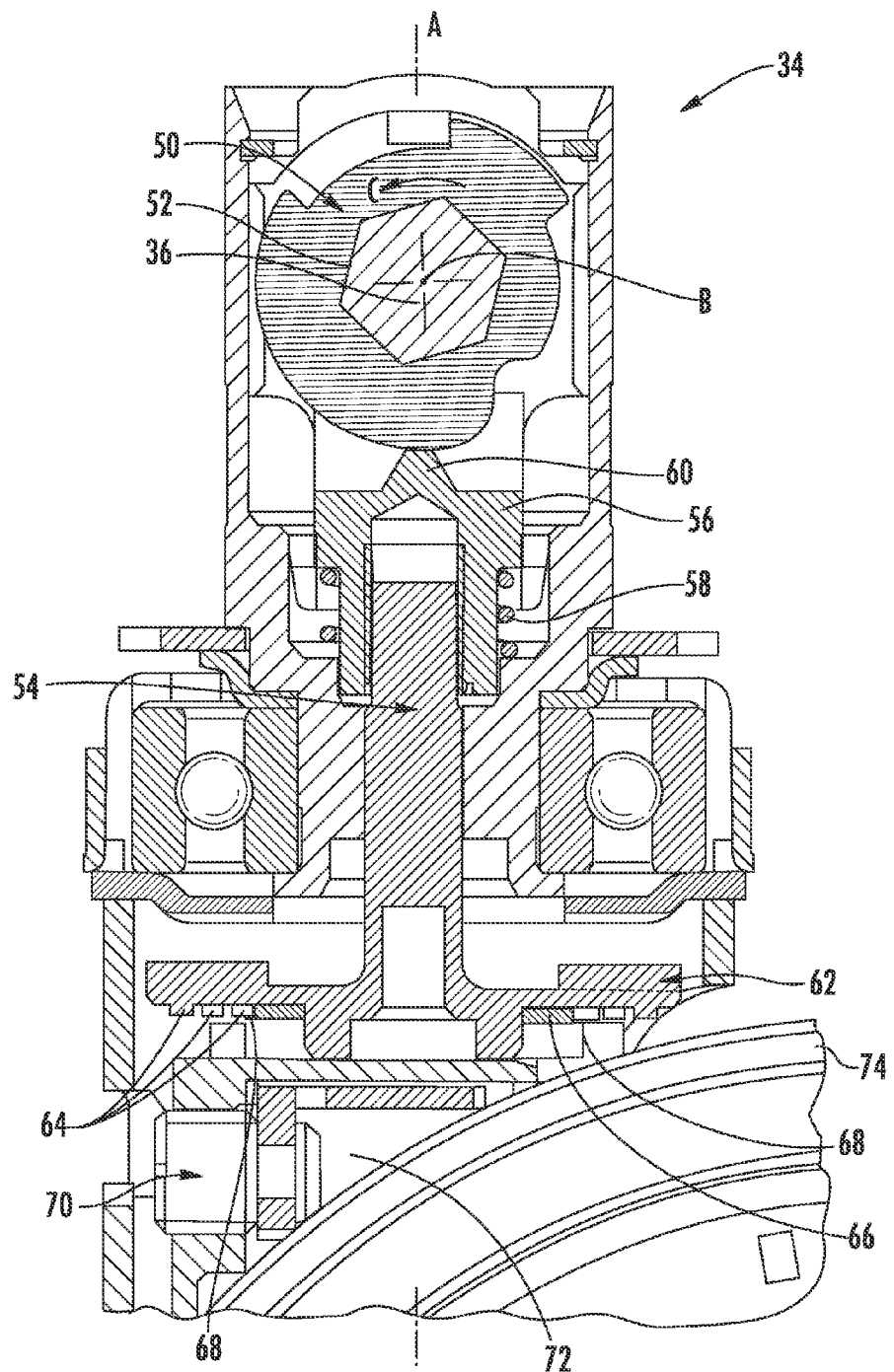
FIG. 4 is a partial cross-sectional view of the caster device shown in FIG. 3 with the brakes applied.

In order to engage the steering lock of the caster device 14, the control cam 50 is rotated (e.g., in a stop-limited manner) in the direction of rotation C, shown in FIG. 4, via the control shaft 36. It can be seen that as the control cam 50 is rotated in the direction C (i.e., in a counterclockwise direction when viewing FIG. 4), a circumferentially directed control cam face lowers the mating cam 60 and the push rod 54 connected thereto vertically counter to the force of the compression spring 58. During the vertical downward displacement of the push rod 54, the rotation-blocking protrusions 64, which project from the steering lock plate 62, enter with rotary locking action into the rotation-blocking receivers 68 of the steering lock part 66, wherein the rotation-blocking receivers 68 are oriented in a congruent manner with the rotation-blocking protrusions 64. In this case, the underside of the steering lock plate 62 rests face-to-face on the steering lock part 66. The caster device 14 is thus blocked in terms of pivoting about the pivot axis A.

During the lowering movement, the push rod 54 also acts on a braking device 70 disposed above the wheel in the fork cavity. The braking device 70 includes a brake block 72, which during the downward displacement of the push rod 54, effects braking action on the surface of the wheel (i.e., the wheel 74).

The brake system 44 may include a brake control assembly is that is configured to apply (e.g., automatically) the brakes of the caster devices 14 under a prescribed condition, such as upon applying power to the bed 10, a period of time after applying power to the bed 10, and/or after a period of time has passed with the brakes being released. The period of time (e.g., 30 seconds, one minute, three minutes, etc.) can be either fixed during production and/or can be set after production, for example, via an input device (e.g., an external keyboard or handheld device). It should be appreciated that the length of the time can be set by other forms of data entry.

Figure 5A:
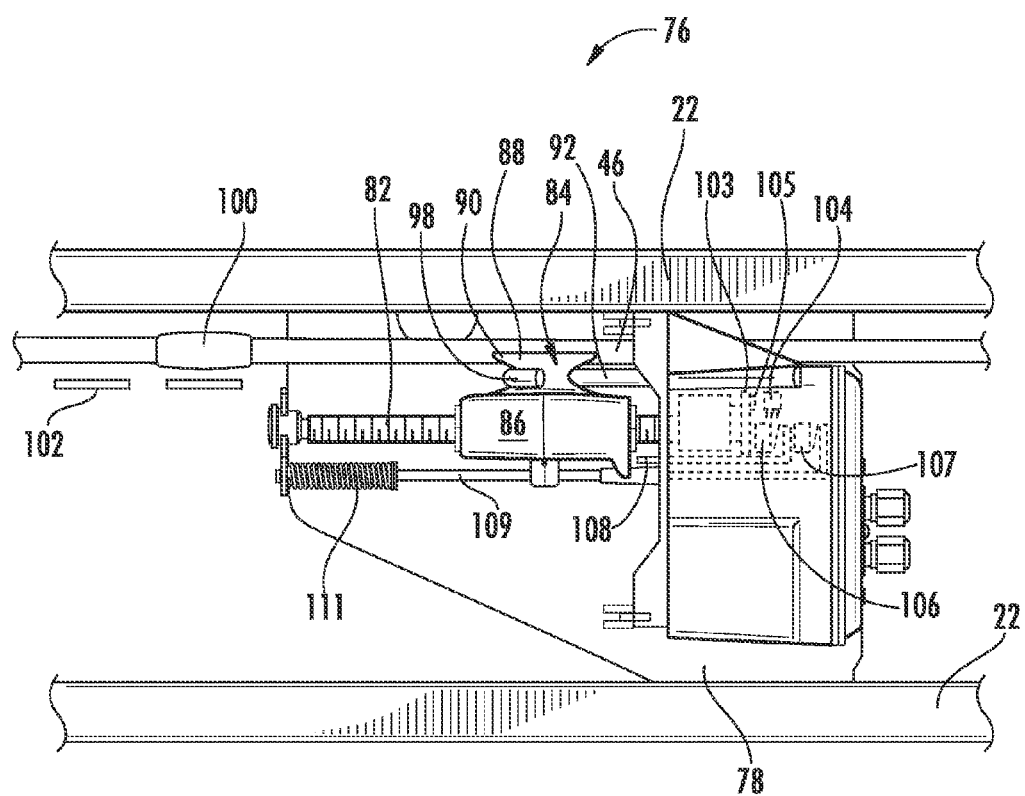
FIGS. 5A-5C enlarged top plan views of an exemplary brake control assembly in a parked position without the brakes applied, in a braked position with the brakes applied, and in a parked position with the brakes applied.
Figure 5B:
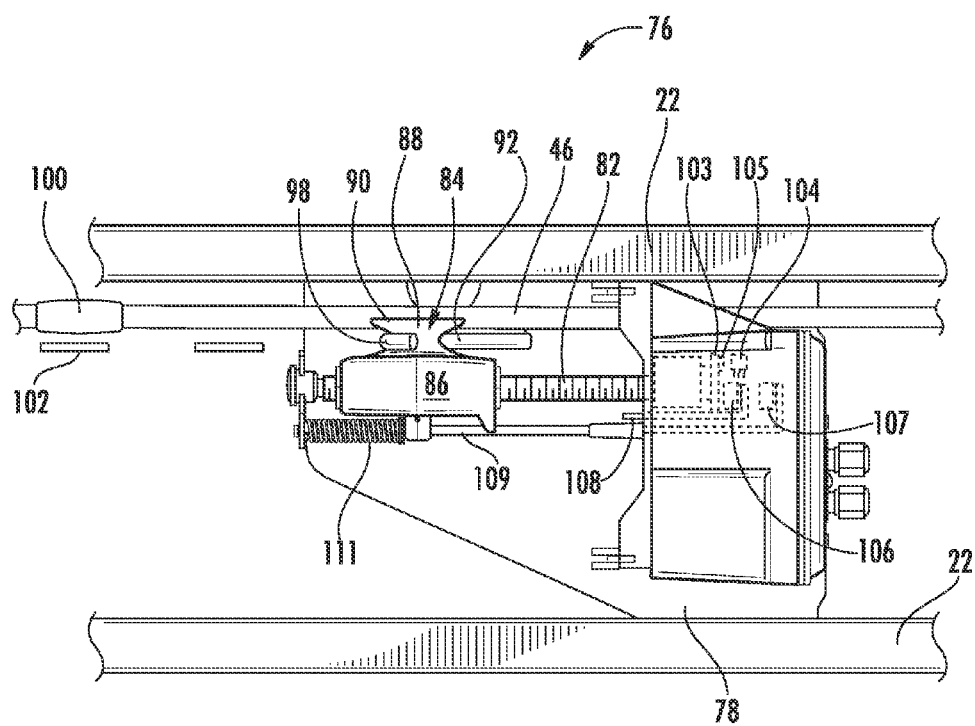
Figure 5C:
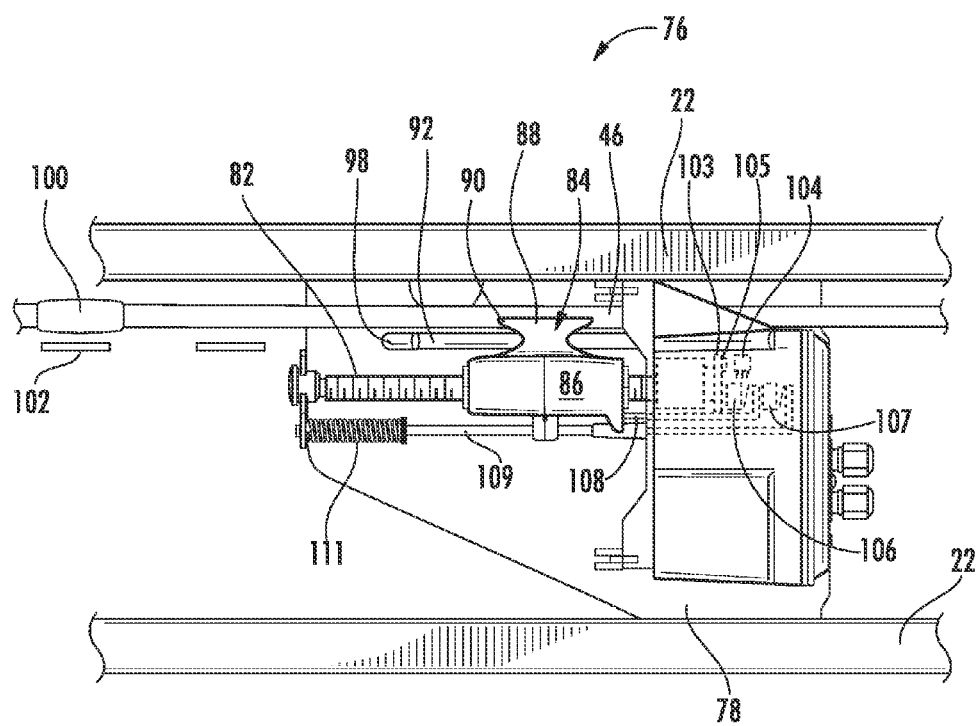

Although the brakes can be automatically applied in any suitable manner, the exemplary brake system 44 interfaces with a brake control assembly, as generally indicated in FIGS. 5A-5C, which may automatically apply the brakes under a predetermined condition (e.g., upon applying power and/or if the brakes are released for a predetermined period of time).

The exemplary brake control assembly may be supported by the base frame 12 between the longitudinally extending frame members 22. The brake control assembly may include an actuator 76, which may be supported in relation to a bracket 78, which may span the frame members 22. The actuator 76 may include any suitable prime mover, such as a motor driven screw, or other suitable driver. Illustratively, a motor 80 may be fixed at a first end 78a of the bracket 78, nearest the foot end 30 of the bed 10. The motor 80 rotatably drives a screw 82. A free end 82a of the screw 82 may be cantilevered or fixed for rotation to a second end 78b of the bracket 78, opposite the first end 78a, nearest the head end 28 of the bed 10.

The screw 82 may drive an engagement piece 84. The engagement piece 84 may be in any suitable form to interface with the brake system 44. The exemplary engagement piece 84 is supported in relation to or defined at least in part by a threaded block 86, which is displaceable by the driven screw 82. Illustratively, the engagement piece 84 extends laterally from a first lateral side of the threaded block 86, although other structural configurations may be contemplated. The engagement piece 84 may include a branch element 88 and a knob 90 (e.g., an enlargement). A captive area 92 is defined between the threaded block 86 and the knob 90. The branch element 88 functions as a structural interface within the captive area 92 that interfaces (i.e., cooperates) with the brake system 44, as will become more apparent in the description that follows.

Figure 6:
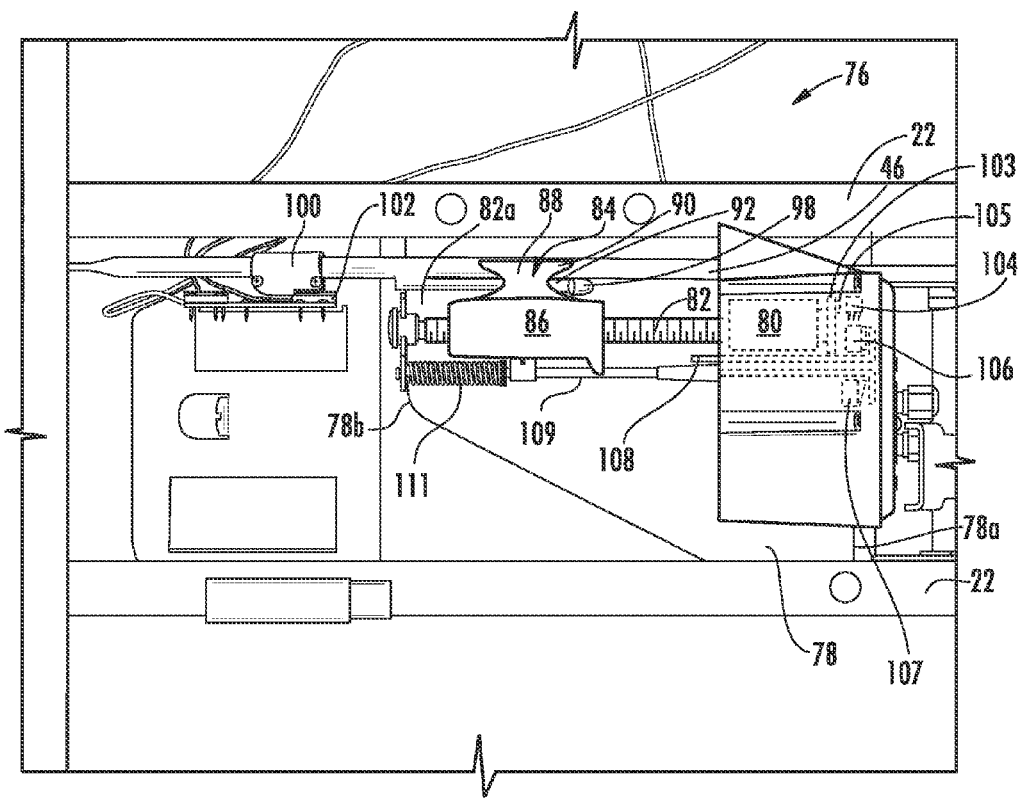
FIG. 6 is an enlarged top perspective view of an exemplary brake control assembly in a parked position without the brakes applied.
Figure 7:
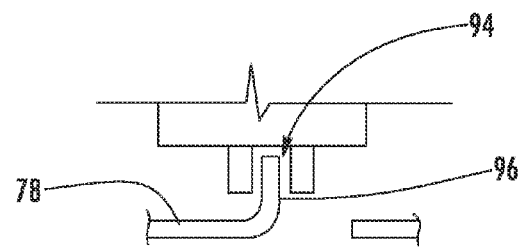
FIG. 7 is an enlarged diagrammatic representation of an exemplary channel and guide arrangement.

The threaded block 86 is fixed against rotation relative to the screw 82 so that rotation of the screw 82 displaces the threaded block 86 along a generally linear path (i.e., left and right when viewing FIG. 6). Although this may be accomplished in any suitable manner, the threaded block 86 illustrated in FIG. 7 supports a channel 94 (e.g., an elongated channel beneath the threaded block 86) for receiving a guide 96 (e.g., an elongated guide extends upward from the bracket 78). The channel 94 and guide 96 cooperate to prevent rotation of the threaded block 86 about the axis of the screw 82.

In operation, the motor 80 drives (i.e., rotates) the screw 82. As the screw 82 rotates, the threaded block 86 travels along the screw 82 guided and fixed against rotation by the cooperating channel 94 and guide 96. As the threaded block 86 travels along the screw 82, the engagement piece 84 moves along with the threaded block 86. As the engagement piece 84 moves, the captive area 92 functions to receive a hook 98 or other suitable structure supported in fixed relation to the longitudinally extending linkage rod 46 of the brake system 44. The hook 98 is engageable with branch element 88. Continued movement of the engagement piece 84 causes displacement of the hook 98. In turn, this causes displacement of the linkage rod 46 to cause angular displacement of each control lever 48, which rotates each control shaft 36. The control shafts 36 operate the caster devices 14 at the opposing ends of the control shafts 36 to apply the brakes.

The operation of the motor 80 can be controlled to automatically apply the brakes in any suitable manner. For example, the exemplary brake system 44 may determine whether the brakes are applied (e.g., a sensor or other component that can register whether the brake system 44 is in a "braked" or an "unbraked" position or status). This may be done with switches (e.g., limit switches), sensors (e.g., magnetic sensors, photo sensors, etc.), and other suitable devices. For example, a magnet 100 may be carried in a fixed relation to the linkage rod 46. A magnetic sensor 102 may be supported in fixed relation to the base frame 12 adjacent the linkage rod 46. The linkage rod 46, when in a first or braked position (i.e., to the right when viewing FIG. 6), may position the magnet 100 adjacent the magnetic sensor 102, which may function as a closed switch when adjacent the magnet 100 to produce a signal representative of the linkage rod 46 being in the braked position, whether the brakes are applied via the brake pedals 40 or the mechanically driven actuator 76. Conversely, when the linkage rod 46 is in a second or released position (i.e., to the left when viewing FIG. 6), the magnet 100 is not longer positioned adjacent the magnetic sensor 102. Consequently, the magnetic sensor 102 may function as an open switch, so that the signal representative of the linkage rod 46 being in the braked position is no longer present.

In the absence of the signal from the magnetic sensor 102, the motor 80 is operated to drive (i.e., rotate) the screw 82. Operation of the motor 80, and thus the travel of the threaded block 86, may be controlled by any suitable component, such as switches, measuring components, or other components. For example, a counter may count the rotations of the screw 82, which may correlate to the travel of the threaded block 86 and the engagement piece 84. Illustratively, a Hall probe 104, or other suitable sensor (e.g., a shaft encoder), may sense the rotations of the screw 82 (e.g., by sensing a permanent magnet 105 on a rotary plate 103 supported in relation to the screw 28). The screw 82 can be operated to rotate a predetermined number of rotations to move the engagement piece 84 into engagement with the hook 98 to displace the linkage rod 46 and apply the brakes. Given the parameters of the brake system 44, the motor 80 may stop driving the screw 82 after the predetermined number of rotations, at which point the brakes are applied. Once the brakes are applied, the threaded block 86 may be moved back to a parked position (i.e., to the left when viewing FIG. 6).

It should be appreciated that the Hall probe 104 may erroneously count (e.g., over-count or under-count) shaft rotations over a number of operating cycles of the brake control assembly. As a consequence, it may be desirable to reset the counter with each operation of the brake control assembly. This may be done in any suitable manner. For example, a control device (e.g., micro switch 106) may reset the counter. The micro switch 106 may be normally closed, for example, by a spring-biased push rod 108. In the parked position (shown in FIG. 5), the threaded block 86 may contact and displace the push rod 108 (i.e., to the right when viewing FIG. 5A), allowing the micro switch 106 to open. This state (i.e., the open state) of the micro switch 106 may cause the counter to reset. It should be understood that the micro switch 106 may be an open switch that may be closed (i.e., in a closed state) by displacement of the push rod 108 to reset the counter.

If the brake is released, (i.e., as indicated by the position of the hook 98 to the right in FIG. 5A), the motor 80 will operate to drive the screw 82 to move the threaded block 86, and thus the engagement piece 84, to displace the linkage rod 46 (i.e., to the left when viewing FIG. 5B) and apply the brakes. Upon applying the brakes, as may be determined by the number of rotations of the screw 82, the threaded block 86 may return to the parked position (i.e., to the right when viewing FIG. 5C) and once again contact and displace the push rod 108 (i.e., to the right when viewing FIG. 5C) to again reset the counter. In this way, the counter may be reset each time the threaded block 86 returns to the parked position, to reduce the risk of error association with erroneous shaft rotation counts. It should be appreciated that the threaded block 86 may be returned to the parked position by operating the motor 80 in a reversed direction, again counting the rotations of the screw 82. After a predetermined number of rotations, the threaded block 86 should be in the parked position.

It should be appreciated that a control device (i.e., a limit switch) may be used to stop the operation of the motor 80 and thus limit the travel of the threaded block 86 in the event that Hall probe 104 makes an error in counting the rotations of the screw 82. The limit switch may be in the form of a micro switch 107, which may be closed (i.e., in a closed state) by a control rod 109, which may be displaced by the threaded block 86 (i.e., upon applying the brakes). For example, the threaded block 86 may engage a spring stop (shown but not referenced) on the control rod 109 to displace the control rod 109 in a first direction (i.e., to the left when viewing FIG. 5B)

and close the micro switch 107 (i.e., to a closed state) and compress a helical spring 111 carried by the control rod 109. The closed micro switch 107 may signal a controller to stop the operation of the motor 80. When the motor 80 is again operated (i.e., in a reverse direction) to return the threaded block 86 to the park position (i.e., shown in FIGS. 5A and 5C), the compressed helical spring 111 may cause displacement of the control rod 109 in a second direction opposite the first direction (i.e., to the right when viewing the drawings) and open the micro switch 107 (i.e., to an open position) It should be noted that the micro switch 107 could be opened (i.e. to an open state) upon applying the brakes and close (i.e., to a closed state) upon returning to the parked position.

As shown in FIG. 6, the travel block 86 may displace the push rod 108 (i.e., to the right when viewing FIG. 6), to open the micro switch 106 (i.e., to an open state) upon applying the brake. This may cause the counter to reset. With the counter reset, the motor 80 may be operated in a reversed direction to move the threaded block 86 to the parked position. Operation of the motor 80 and the travel of the threaded block 86 may again be controlled by the counter, which counts the rotations of the screw 82. After a predetermined number of rotations, the threaded block 86 should be in the parked position.

The micro switch 107 may be closed (i.e., to a closed state) by a control rod 109 when the engagement piece 88 returns to the parked position. As should be clearly understood, the engagement piece 88 may engage a spring stop on the control rod 109 to displace the control rod 109 in a first direction (i.e., to the left when viewing FIG. 6) and close the micro switch 107 (i.e., to the closed state) and compress a helical spring 111 carried by the control rod 109. The closed micro switch 107 may signal a controller to stop the operation of the motor 80 in the event the motor 80 fails to stop based on the rotations counted by the counter. When the motor 80 is once again operated to apply the brakes, the compressed helical spring 111 may cause displacement of the control rod 109 in a second direction opposite the first direction (i.e., to the right when viewing FIG. 6) and open the micro switch 107 (i.e., to an open state).

It should be appreciated that the counter may be reset when the threaded block 86 to the engaged position, the parked position, or both.

It should also be appreciated that, instead of using a Hall probe 104, other control devices may be used to control the travel of the threaded block 86. For example, one micro switch 106 may be used to limit the travel of the threaded block 86 in a first direction (i.e., to apply the brakes or park the threaded block 86) and the other switch 107 may be used to limit the travel of the threaded block 86 in a second direction (i.e., to park the threaded block 86 or apply the brakes).

Figure 8:
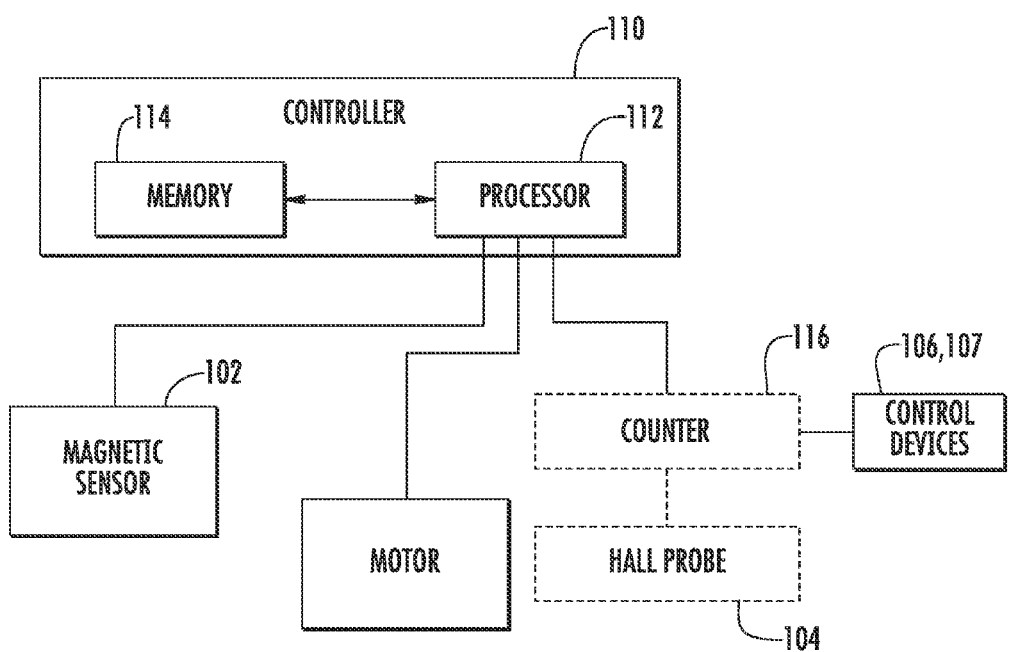
FIG. 8 is a general schematic showing basic components for controlling the brake control assembly.

As shown in FIG. 8, the actuator 76 may be controlled by a bed controller 110. The controller 110 may be a master controller that controls the operation of the lifts, the articulated deck, and other features of the bed 10. Illustratively, the controller 110 may generally include an onboard processor 112, with access to memory 114 having stored data, such as a computer program and other information, for controlling the operation of the processor 112. The state of the signal input from the magnetic sensor 102 to the processor 112 indicating that the linkage rod 46 is in the braked position, the processor 112 provides an output signal to drive the motor 80. As the motor 80 is driven, the Hall probe 106 may count the shaft rotations, which are registered with the counter 116. Upon reaching a predetermined number of shaft rotations, the counter 116 is reset, and the motor 80 reverses direction to drive the screw 82 a predetermined number of shaft rotations to move the threaded block 86 back to the parked position, where the threaded block 86 remains parked until the brake has been again released. It should be appreciated that the operation of the motor 80 may be controlled by control devices (e.g., sensors, switches, etc.) other than the Hall probe 106.

In operation, the brakes may be applied automatically after the bed has been supplied AC power (e.g., one minute after the power is supplied) and the brakes are not engaged, or after a predetermined period after the brakes have been released when the power is supplied. For example, if the brakes are released and AC power is not removed, such as when the bed needs to be temporarily moved for cleaning, the brakes will automatically be applied after a predetermined period (e.g., three minutes after the brakes are released).

It should be appreciated the bed 10 and the braking system 44 are shown and described for illustrative purposes, as is the brake control assembly, and that the brake system 44 may prevent rotation as well as steering of the wheels 74.

It should also be appreciated that the brakes do not have to be mechanically operated but can be operated any known electric, pneumatic or hydraulic actuating device. In such a case, the caster brake system 44 need not employ linkage rods, control levers and control shafts.

It should further be appreciated that appropriate switches can be used, for example, installed on bed push handles, or otherwise within the reach of the nursing staff, to control the operation of the brakes.

It should further be appreciated that the automatic braking feature may be powered by a battery onboard the bed, which allows it to function in the absence of an external power supply.

Generally, the brake control assembly monitors the status (i.e., "braked," "applied" or "engaged," or "unbraked," "released" or "disengaged") of the brakes. This automatic braking feature reduces the risk of a patient falling due to the bed brakes being released. The feature provides simple control over the bed for medical staff in that it whether the brakes are applied. If, after a predetermined period of time, the bed is not moved and the brakes are released, the feature automatically applies the brakes. The bed 10 can be made mobile again by simply releasing the brakes with the aid of the brake pedal. The brakes can be manually applied or released at any time.

It should further be appreciated that the engagement piece 86 (e.g., having opposing captive areas 92) may interface with many brake systems, which allows the brake control assembly to be used on many base frames 12, at the head or foot end 28, 30 of the base frame 12, either in the same direction or oriented (i.e., 180 degrees in a horizontal plane) on either end 28, 30 of the base frame 12.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:
1. A hospital bed comprising:
a base frame;
at least one caster device supporting the base frame in relation to a supporting surface, the at least one caster device having a caster brake;
a brake control assembly operatively engageable to the caster brake for applying the caster brake, the brake control assembly comprising:
a sensor for sensing a status condition of the caster brake;

a controller connected to the sensor, the controller causing the brake control assembly to apply the caster brake when the sensor senses the status condition for a predetermined period of time.

2. The hospital bed of claim 1, further comprising a linkage rod, wherein one of the brake control assembly and the linkage rod comprises an engagement piece and the other one of the linkage rod and brake control assembly comprises a protrusion that is engageable with the engagement piece so as to cause displacement of the linkage rod to apply the caster brake.

3. The hospital bed of claim 2, further comprising an actuatable shaft for displacing the engagement piece, wherein the displacement of the engagement piece is dependent upon actuation of the shaft.

4. The hospital bed of claim 3, wherein the actuatable shaft is a rotatable screw, and wherein displacement of the engagement member is determined by a control device selected from the group comprising a limit switch, a sensor, and a Hall probe.

5. The hospital bed of claim 1, wherein the sensor comprises a magnetic sensor for sensing a magnet, one of the sensor and the magnet being fixed in relation to a linkage rod, the status condition occurring when the sensor senses the magnet.

6. The hospital bed of claim 1, wherein the status condition is selected from the group comprising a detection of power to the hospital bed, the caster braked being applied, the caster brake being released.

7. A hospital bed comprising:
a base frame;
a plurality of caster devices supporting the base frame in relation to a supporting surface, at least one of the plurality of caster devices having a caster brake;
a brake system comprising a linkage rod operatively connected to a control shaft for applying the caster brake; and
a brake control assembly comprising:
an engagement piece operatively engageable with the linkage rod;
a sensor for sensing a status condition of the caster brake;
a controller connected to the sensor for signaling the controller when the sensor senses the status condition, the controller controlling the engagement piece to displace the linkage rod to apply the caster brake when the sensor senses the status condition for a predetermined period of time.

8. The hospital bed of claim 7, further comprising a protrusion that is fixed in relation to the linkage rod, wherein the engagement piece engages the protrusion to displace the linkage rod to apply the caster brake.

9. The hospital bed of claim 8, further comprising a screw rotatable in a first direction by a motor for displacing the engagement piece, wherein the displacement of the engagement piece is dependent upon a number of screw rotations.

10. The hospital bed of claim 9, the number of screw rotations is measured by a Hall probe and counted by a counter, which is reset by a micro switch.

11. The hospital bed of claim 10, wherein the screw is rotatable in a second direction opposite the first direction by the motor to move the engagement piece out of engagement with the protrusion to a parked position to allow the caster brake to be manually released.

12. The hospital bed of claim 7, wherein the sensor comprises a magnetic sensor for sensing a magnet, one of the sensor and the magnet being fixed in relation to the linkage rod, the status condition occurring when the sensor senses the magnet.

13. The hospital bed of claim 7, wherein the status condition is selected from the group comprising a detection of power to the hospital bed, the caster braked being applied, the caster brake being released.

14. A bed comprising:
a base frame;
at least one caster device supporting the base frame for movement in relation to a supporting surface;
a caster brake system comprising:
a linkage rod displaceable to a braked position wherein a brake of the at least one caster device is applied to effect a braking action on a wheel of the at least one caster device, and
a brake control assembly comprising:
an actuator configured to be supported in relation to the base frame;
an engagement piece supported in relation to the actuator for movement by the actuator, the engagement piece being engageable with the linkage rod to displace the linkage rod to effect the braking action;
a sensor for sensing a status condition;
a controller for controlling the operation of the actuator in response to the status condition occurring for a predetermined period of time, wherein the actuator moves the engagement piece into engagement with the linkage rod to displace the linkage rod to effect the braking action.

15. The hospital bed of claim 14, further comprising a protrusion that is fixed in relation to the linkage rod, wherein the engagement piece engages the protrusion to displace the linkage rod to apply the caster brake.

16. The hospital bed of claim 15, wherein the actuator comprises a screw rotatable in a first direction by a motor for displacing the engagement piece, wherein displacement of the engagement piece is dependent upon a number of screw rotations.

17. The hospital bed of claim 16, wherein the number of screw rotations is measured by a Hall probe and counted by a counter, which is reset by a micro switch.

18. The hospital bed of claim 17, wherein the screw is rotatable in a second direction opposite the first direction by the motor for displacing the engagement piece out of engagement with the protrusion to a parked position.

19. The hospital bed of claim 14, wherein the sensor is a magnetic sensor for sensing a magnet, one of the sensor and the magnet being fixed in relation to the linkage rod, the status condition occurring when the sensor senses the magnet.

20. The hospital bed of claim 14, wherein the status condition is selected from the group comprising a detection of power to the hospital bed, the caster braked being applied, the caster brake being released.

* * * * *